(12) United States Patent
Kim et al.

(10) Patent No.: US 9,575,228 B2
(45) Date of Patent: Feb. 21, 2017

(54) DISPLAY DEVICE INCLUDING A COLOR CONVERSION LAYER

(71) Applicant: Samsung Display Co., Ltd., Yongin, Gyeonggi-Do (KR)

(72) Inventors: Dong-Uk Kim, Hwaseong-si (KR); Baek Hee Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 78 days.

(21) Appl. No.: 14/522,889

(22) Filed: Oct. 24, 2014

(65) Prior Publication Data

US 2015/0285969 A1 Oct. 8, 2015

(30) Foreign Application Priority Data

Apr. 3, 2014 (KR) .......................... 10-2014-0040051

(51) Int. Cl.
*G02B 5/22* (2006.01)
*G02B 5/20* (2006.01)

(52) U.S. Cl.
CPC .................................... *G02B 5/201* (2013.01)

(58) Field of Classification Search
CPC ........... G02B 5/201; G02B 5/22; G02B 5/223; G02B 5/003; G02B 1/04; G02B 5/23; G02B 21/0076; G02B 5/008; G02B 5/287; G02F 1/133512; G02F 1/167; H01L 31/02322; H01L 31/055; H01L 33/502; F21K 9/56
USPC ................................................ 359/885, 891
See application file for complete search history.

(56) References Cited

U.S. PATENT DOCUMENTS

| 7,715,086 B2 | 5/2010 | Yamamoto et al. |
| 7,907,323 B2 | 3/2011 | Shimotani et al. |
| 2012/0326180 A1* | 12/2012 | Ohe ............... H01L 27/322 257/88 |

FOREIGN PATENT DOCUMENTS

| KR | 10-1017583 B1 | 2/2011 |
| KR | 10-1048378 B1 | 7/2011 |
| KR | 10-1062789 B1 | 8/2011 |
| KR | 1020120023034 A | 3/2012 |
| KR | 10-1176510 B1 | 8/2012 |
| KR | 10-1182359 B1 | 9/2012 |
| KR | 1020130044032 A | 5/2013 |

OTHER PUBLICATIONS

Lee et al., "Enhanced emission from BaMgAl10O17:Eu2+ by localized surface plasmon resonance of silver particles", Optics Express, vol. 18, No. 12, May 24, 2010, pp. 12144-12152.
Lee et al., "Localized surface plasmon enhanced cathodoluminescence from Eu3+-doped phosphor near the nanoscaled silver particles", Optics Express, vol. 19, No. 14, 4 Jul. 2011, pp. 13209-13217.

* cited by examiner

*Primary Examiner* — Jade R Chwasz
(74) *Attorney, Agent, or Firm* — Cantor Colburn LLP (57) ABSTRACT

A display device includes a display panel, a backlight unit and a color conversion layer. The color conversion layer includes light emitting particles and metal particles. The light emitting particles are configured to receive a first light and to generate a second light having a wavelength different from the first light. The metal particles are configured to receive the first light or the second light and to cause a surface plasmon resonance.

19 Claims, 7 Drawing Sheets

DISPLAY DEVICE INCLUDING A COLOR CONVERSION LAYER

This application claims priority to Korean Patent Application No. 10-2014-0040051, filed on Apr. 3, 2014, and all the benefits accruing therefrom under 35 U.S.C. §119, the contents of which are hereby incorporated by reference in its entirety.

BACKGROUND

1. Field

The invention relates to a display device. More particularly, the invention relates to a display device including a color conversion layer.

2. Description of the Related Art

Various display devices, such as a liquid crystal display device, an electrowetting display device, an electrophoretic display device, etc., are widely used. The display device includes a light-receiving type display panel and a backlight unit configured to provide light to the display panel. In general, the backlight unit provides a white light to the display panel and the white light is converted to a light having a specific color, and thus a user perceives the light.

SUMMARY

In a display device including a color conversion layer, a light emitting efficiency of the light is insufficient in the display device and light leakage and color mixture occurs in the display device.

One or more exemplary embodiment of the invention provides a display device capable of improving light emitting efficiency and reducing or effectively preventing occurrence of light leakage and color mixture.

Exemplary embodiments of the invention provide a display device including a display panel, a backlight unit and a color conversion layer. The backlight unit is configured to provide a first light to the display panel. The color conversion layer is on the display panel and includes light emitting particles and metal particles. The light emitting particles are configured to receive the first light and to generate a second light having a wavelength different from the first light. The metal particles are configured to receive the first light or the second light and to cause a surface plasmon resonance.

The light emitting particles and the metal particles may be distributed in the color conversion layer.

The color conversion layer may include a light emitting particle layer which includes the light emitting particles, and a metal particle layer which is on the light emitting particle layer and includes the metal particles.

The metal particle layer may be provided in a plural number.

The metal particles may include first metal particles, and second metal particles of a metal material different from that of the first metal particles.

The color conversion layer may include a light emitting particle layer which includes the light emitting particles, a first metal particle layer which is on the light emitting particle layer and includes the first metal particles, and a second metal particle layer which is on the light emitting particles layer and includes the second metal particles.

The color conversion layer may include a first light emitting metal layer in which the light emitting particles and the first metal particles are distributed, and a second metal particle layer which is on the first light emitting metal layer and includes the second metal particles.

The color conversion layer may include a second light emitting metal layer in which the light emitting particles and the second metal particles are distributed, and a first metal particle layer which is on the second light emitting metal layer and includes the first metal particles.

The first light may be a blue light.

The display panel may include a plurality of pixel areas, each of the pixel areas may include a red pixel area, a green pixel area and a blue pixel area. The display device may include a plurality of color conversion layers which include a red color conversion layer overlapped with the red pixel area and a green color conversion layer overlapped with the green pixel area.

The display device may further include a scattering layer overlapping the blue pixel area, and the scattering layer may include scatter particles configured to scatter the first light.

The red color conversion layer may include red metal particles, the green color conversion layer may include green metal particles, and an average particle diameter of the red metal particles may be greater than an average particle diameter of the green metal particles.

An average particle diameter of the scatters may be smaller than the average particle diameter of the green metal particles.

The display device may further include a band-pass filter between the color conversion layer and the display panel, and a recycling layer on the color conversion layer and configured to reflect a portion of the first light passed through the color conversion layer.

The metal particles may include at least one selected from gold, silver, aluminum, platinum, palladium, cadmium, cobalt, ruthenium, copper, indium, nickel, iron and alloys thereof.

A portion of the metal particles may include a dielectric layer thereon.

The dielectric layer may include a first dielectric sub-layer, and a second dielectric sub-layer on the first dielectric sub-layer.

The dielectric layer includes at least one selected from titanium oxide, silicon oxide, magnesium oxide, aluminum oxide, yttrium oxide, silicon nitride and aluminum nitride.

The light emitting particles may include fluorescent material or a quantum dot.

According to one or more exemplary embodiment, the light emission efficiency of the display device may be improved, and the light leakage and the color mixture may be reduced or effectively prevented from occurring.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, connected may refer to elements being physically and/or electrically connected to each other. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "above" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 1:
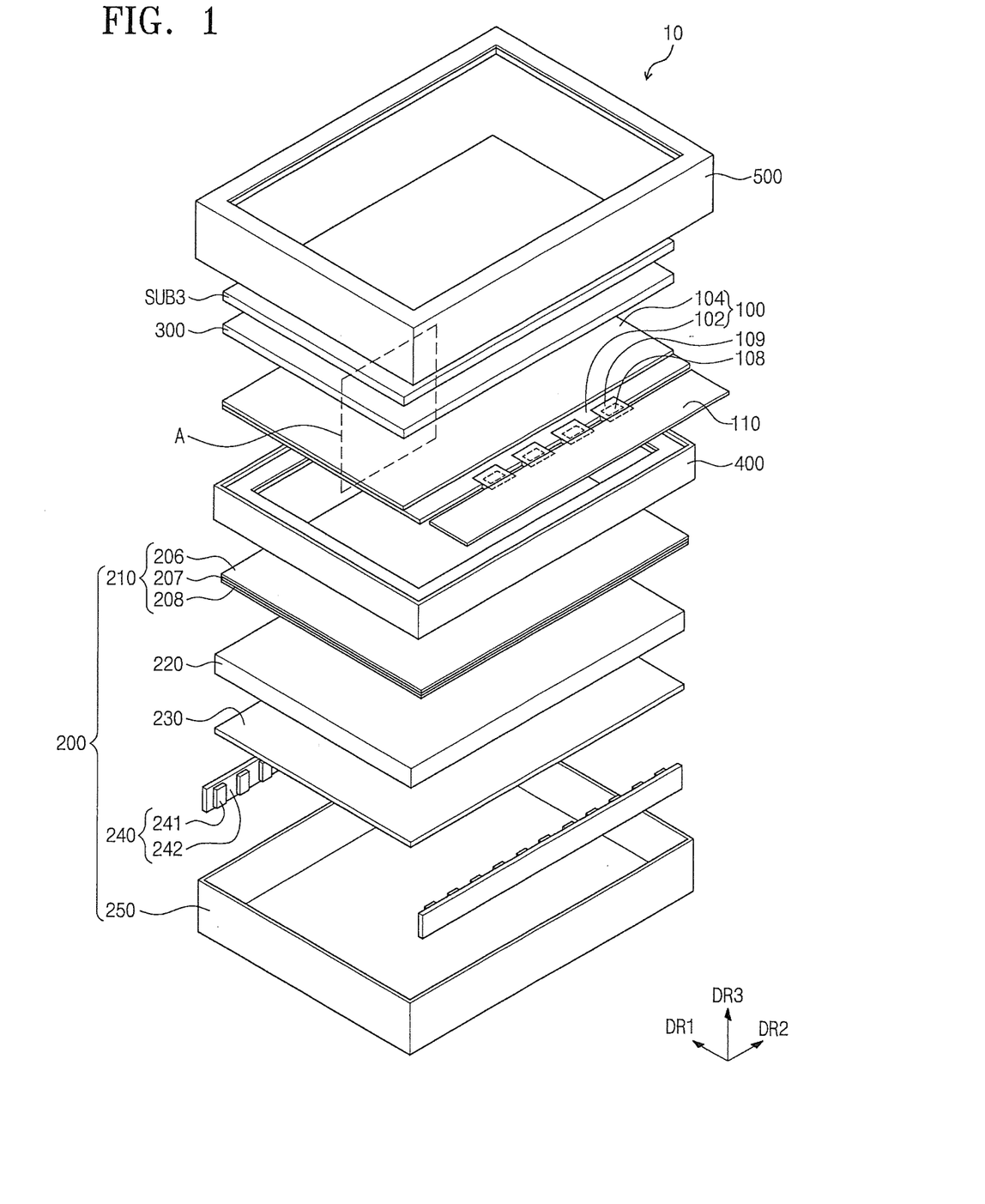
FIG. 1 is an exploded perspective view showing an exemplary embodiment of a display device according to the invention.
Figure 2:
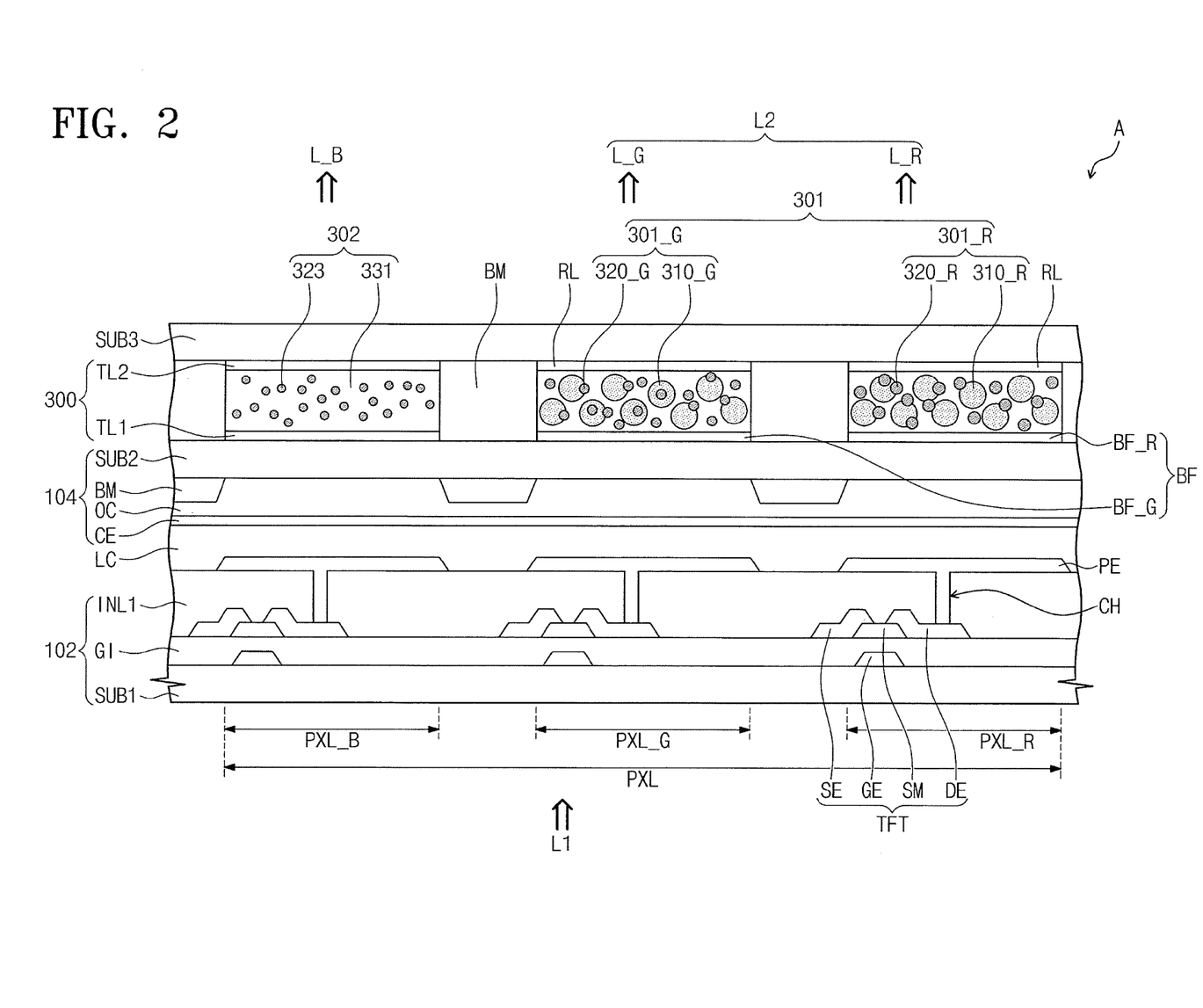
FIG. 2 is a cross-sectional view showing portion "A" in FIG. 1.

FIG. 1 is an exploded perspective view showing an exemplary embodiment of a display device according to the invention and FIG. 2 is a cross-sectional view showing portion "A" in FIG. 1.

Referring to FIGS. 1 and 2, a display device 10 includes a display panel 100, a backlight unit 200, a bottom chassis 250, a color conversion layer member 300, a mold frame 400 and a top chassis 500.

Hereinafter, a short side direction of the display device 10 is referred to as a first direction DR1 and a long side direction of the display device 10 is referred to as a second direction DR2. The bottom chassis 250, the backlight unit 200, the mold frame 400, the display panel 100, the color conversion layer member 300 and the top chassis 500 are sequentially stacked one on another in a third direction DR3 substantially vertical to the first and second directions DR1 and DR2.

As the display panel 100, a non-self emissive display panel for which the backlight unit 200 is used rather than a self-emissive display panel such as an organic light emitting display panel. In exemplary embodiments, for instance, various display panels, e.g., a liquid crystal display panel, an electrophoretic display panel, etc., may be used as the display panel 100. In the illustrated exemplary embodiment, the liquid crystal display panel will be described as a representative example.

The display panel 100 displays an image. The display panel 100 includes a display area in which the image is displayed and a non-display area in which no image is displayed.

The display panel 100 includes a first display substrate otherwise referred to as a first substrate 102, a second display substrate otherwise referred to as a second substrate 104 facing the first substrate 102 while being coupled to the first substrate 102, and a liquid crystal layer LC interposed between the first substrate 102 and the second substrate 104.

The display panel 100 includes a plurality of pixel areas PXL. Each of the pixel areas PXL includes a thin film transistor TFT to drive liquid crystal molecules in the liquid crystal layer LC and a pixel electrode PE.

In an exemplary embodiment, the pixel areas PXL may be defined by gate lines (not shown) and data lines (not shown), but the invention is not limited thereto or thereby. Each collective pixel area PXL includes a red pixel area PXL_R, a green pixel area PXL_G and a blue pixel area PXL_B. In the illustrated exemplary embodiment, each collective pixel area PXL includes the red, green and blue pixel areas PXL_R, PXL_G and PXL_B, but each collective pixel area PXL may further include a white pixel area (not shown).

The red pixel area PXL_R emits a red light L_R and is overlapped with a red color conversion layer 301_R. The green pixel area PXL_G emits a green light L_G and is overlapped with a green color conversion layer 301_G. The blue pixel area PXL_B emits a blue light L_B and is overlapped with a scattering layer 302.

The red color conversion layer 301_R includes red light emitting particles 310_R and metal particles 320_R for the red color (hereinafter, referred to as red metal particles), and the green color conversion layer 301_G includes green light emitting particles 310_G and metal particles 320_G for the green color (hereinafter, referred to as green metal particles).

The scattering layer 302 is overlapped with the blue pixel area PXL_B. The scattering layer 302 includes scatter particles 323. The scatter particles 323 are configured to scatter a first light L1. The scatter particles 323 include $TiO_2$ or metal, but are not limited thereto or thereby. The scatter particles 323 may include a same metal material as the metal particles 320 of the red and green metal particles.

The scattering layer 302 including the scatter particles 323 is filled with a scattering-insulating material 331 in which the scatter particles 323 are dispersed. In an exemplary embodiment, the scattering-insulating material 331 may include a same material as an insulating material 330 (refer to FIG. 4) filled in a color conversion layer 301. In an exemplary embodiment, for instance, the scattering-insulating material 331 may include a silicon resin or an epoxy resin, but is not limited thereto or thereby. That is, the scattering-insulating material 331 may include a material different from that of the insulating material 330 filled in the color conversion layer 301. In addition, the scattering-insulating material 331 is configured to transmit light, and thus an emission efficiency of the light passing through the scattering-insulating material 331 may be improved.

In the illustrated exemplary embodiment, the scattering layer 302 is overlapped with the blue pixel area PXL_B, but is not limited thereto or thereby. The scattering layer 302 may be replaced with a blue color conversion layer (not shown).

Figure 3:
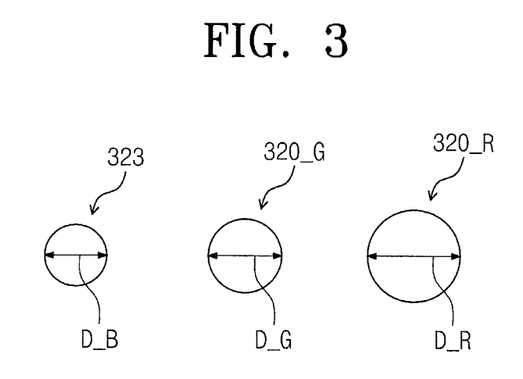
FIG. 3 is a view showing a cross-section of exemplary embodiments of a scatter particle, a metal particle for a green color and a metal particle for a red color.

FIG. 3 is a view showing a cross-section of exemplary embodiments of a scatter particle, a green metal particle and a red metal particle.

As a wavelength of the light becomes longer, a size of the metal particles, which induce a surface plasmon resonance, tends to increase. A red metal particle 320_R, a green metal particle 320_G and a scatter particle 323 has a particle diameter D_R, D_G and D_B, respectively. Referring to FIG. 3, an average particle diameter of the red metal particles 320_R is greater than an average particle diameter of the green metal particles 320_G and an average particle diameter of the scatter particles 323. The average particle diameter of the green metal particles 320_G is greater than the average particle diameter of the scatter particles 323. The average particle diameter of the red metal particles 320_R is largest and the average particle diameter of the scatter particles 323 is smallest among the average particles diameters.

Referring to FIGS. 1 and 2 again, a black matrix BM is disposed between the red color conversion layer 301_R and the green color conversion layer 301_G. The black matrix BM reduces or effectively prevents the red light L_R of the red color conversion layer 301_R and the green light L_G of the green color conversion layer 301_G from leaking and reduces or effectively prevents the red light L_R of the red color conversion layer 301_R from being mixed with the green light L_G of the green color conversion layer 301_G.

In addition, the black matrix BM is disposed between the green color conversion layer 301_G and the scattering layer 302. The black matrix BM reduces or effectively prevents the green light L_G of the green color conversion layer 301_G and the blue light L_B of the scattering layer 302 from leaking and reduces or effectively prevents the green light L_G of the green color conversion layer 301_G from being mixed with the blue light L_B of the scattering layer 302.

In FIG. 2, the black matrix BM is disposed between the red color conversion layer 301_R and the green color conversion layer 301_G, but the black matrix BM may be omitted. Where the black matrix BM between the red color conversion layer 301_R and the green color conversion layer 301_G is omitted, the red color conversion layer 301_R and the green color conversion layer 301_G are disposed to be adjacent to each other.

The first substrate 102 includes a first base substrate SUB1, the thin film transistor TFT and the pixel electrode PE.

The first base substrate SUB1 may be a transparent insulating substrate, e.g., a plastic substrate, a glass substrate, a quartz substrate, etc.

The gate lines and the data lines are disposed on the first base substrate SUB1. In an exemplary embodiment, the gate lines extend in the first direction DR1 on the first base substrate SUB1. The data lines extend in the second direction DR2 substantially perpendicular to the first direction DR1 to cross the gate lines such that a gate insulating layer GI is disposed between the gate lines and the data lines.

The thin film transistor TFT includes a gate electrode GE, a semiconductor pattern SM, a source electrode SE and a drain electrode DE.

The gate electrode GE is branched from the gate line GL or provided at a portion of the gate line GL. The gate electrode GE includes a metal material. The gate electrode GE may have a multi-layer structure. The gate electrode GE includes nickel, chromium, molybdenum, aluminum, titanium, copper, tungsten or alloys thereof.

The gate insulating layer GI is disposed on the gate electrode GE. The gate insulating layer GI is disposed over the entire surface of the first base substrate SUB1 to cover the gate line and the gate electrode GE.

The semiconductor pattern SM is disposed on the gate insulating layer GI. The semiconductor pattern SM is disposed on the gate electrode GE while the gate insulating layer GI is disposed between the gate electrode GE and the semiconductor pattern SM, and thus a portion of the semiconductor pattern SM is overlapped with the gate electrode GE.

The source electrode SE is branched from the data line. A portion of the source electrode SE is overlapped with the gate electrode GE.

The drain electrode DE is spaced apart from the source electrode SE while the semiconductor pattern SM is disposed between the drain electrode DE and the source electrode SE in the plan view. A portion of the drain electrode DE is overlapped with the gate electrode GE. A portion of the semiconductor pattern SM is exposed by the spaced apart drain and source electrodes DE and SE.

The source electrode SE and the drain electrode DE may have a multi-layer structure. The source electrode SE and the drain electrode DE include nickel, chromium, molybdenum, aluminum, titanium, copper, tungsten or alloys thereof.

The pixel electrode PE is disposed on a first insulating layer INL1. The first insulating layer INL1 may have a multi-layer structure of an organic layer and/or an inorganic layer.

The pixel electrode PE is connected to the drain electrode DE via a contact hole CH. The pixel electrode PE includes a transparent conductive material. The pixel electrode PE includes a transparent conductive oxide, e.g., indium tin oxide ("ITO"), indium zinc oxide ("IZO"), indium tin zinc oxide ("ITZO"), etc. In an exemplary embodiment of manufacturing a display device, the pixel electrode PE may be formed through various methods, e.g., a photolithography process.

The second substrate 104 includes a second base substrate SUB2, the black matrix BM and a common electrode CE. According to another exemplary embodiment, although not shown in figures, the black matrix BM and the common electrode CE may be included in the first substrate 102.

The second base substrate SUB2 may be a transparent insulating substrate, e.g., a plastic substrate, a glass substrate, a quartz substrate, etc.

The black matrix BM is disposed on the second substrate 104 to correspond to a light blocking area of the first substrate 102. The light blocking area corresponds to an area in which the data line, the thin film transistor TFT and the gate line are disposed. The pixel electrode PE is not disposed in the light blocking area, and thus the liquid crystal molecules of the liquid crystal layer LC are not aligned, thereby causing the light leakage. Thus, the black matrix BM is disposed in the light blocking area to reduce or effectively prevent the light leakage from occurring. In an exemplary embodiment of manufacturing a display device, the black matrix BM may be formed by forming a light blocking layer absorbing a light and patterning the light blocking layer through a photolithography process, however the invention is not limited thereto or thereby. In an exemplary embodiment, for instance, the black matrix BM may be formed by an inkjet method.

A planarization layer OC is disposed on the black matrix BM. The planarization layer OC planarizes an upper surface of the second base substrate SUB2 including the black matrix BM.

The common electrode CE is disposed on the planarization layer OC. The common electrode CE includes a transparent conductive material. The common electrode CE includes a conductive metal oxide, such as ITO, IZO, ITZO, etc. In an exemplary embodiment of manufacturing a display device, the common electrode CE is formed through various methods, e.g., a photolithography process.

The liquid crystal layer LC includes the liquid crystal molecules having refractive index anisotropy. The liquid crystal molecules in the liquid crystal layer LC are rotated in a specific direction between the first substrate 102 and the second substrate 104 when the electric field is formed between the pixel electrode PE and the common electrode CE, and thus a transmittance of the light passing through the liquid crystal layer LC is controlled.

The color conversion layer member 300 is disposed on the display panel 100 and includes the light emitting particles 310 and the metal particles 320. The color conversion layer member 300 will be described in detail later.

The display device 10 further includes a third base substrate SUB3. The third base substrate SUB3 is disposed on the color conversion layer member 300.

The third base substrate SUB3 may be a transparent insulating substrate, e.g., a plastic substrate, a glass substrate, a quartz substrate, etc.

A driving chip 108 is disposed at a side of the first substrate 102 and configured to apply a data signal to the data lines. The driving chip 108 generates the data signal applied to the data line of the display panel 100 in response to an external signal. The external signal is provided from a printed circuit board 110 and may include an image signal, various control signals and/or a driving voltage.

A gate driving circuit (not shown) is disposed at a side of the first substrate 102, such as a side opposing the side at which the driving chip 108 is disposed, such as through a thin film process to apply a gate signal to the gate lines. Accordingly, the gate driving circuit may be disposed within the display panel 100.

The driving chip 108 applies the driving signal to the display panel 100 and the printed circuit board 110 is electrically connected to the display panel 100.

The driving chip 108 is configured to include two or more driving chips, e.g., a data driving chip, a gate driving chip, etc., and may be mounted on the first substrate 102 by a chip-on-glass ("COG") manner.

The printed circuit board 110 is electrically connected to the display panel 100 through a plurality of tape carrier packages 109, and the driving chips 108 are respectively mounted on the tape carrier packages 109. The tape carrier packages 109 are bent to cover a side surface of the bottom chassis 250.

The printed circuit board 110 connected to the tape carrier packages 109 is disposed under the bottom chassis 250 when the tape carrier packages 109 are bent to cover a side surface of the bottom chassis 250. Where the printed circuit board 110 is disposed under the bottom chassis 250, the display device 10 further includes a shield case (not shown) disposed under the bottom chassis 250 to protect the printed circuit board 110.

The backlight unit 200 generates and provides the first light L1 to the display panel 100. The first light L1 has a visible wavelength, e.g., a blue light.

The backlight unit 200 includes a light source unit 240 and a light guide plate 220. The light source unit 240 provides the first light L1 to the light guide plate 220. The light source unit 240 includes at least one light source 241 configured to generate and to emit the first light L1, and a circuit board 242 to apply a source voltage to the light source 241. The light source 241 is mounted on the circuit board 242.

The light guide plate 220 guides the first light L1 provided from the light source unit 240. The circuit board 242 has a plate shape. The light source unit 240 may include a light emitting diode as the light source 241. A plurality of light emitting diodes are disposed on the circuit board 242 and arranged in the second direction DR2 at regular intervals.

The backlight unit 200 further includes an optical member 210 disposed between the light guide plate 220 and the display panel 100, and a reflective sheet 230 disposed under the light guide plate 220.

The optical member 210 includes a first optical sheet 206, a second optical sheet 207 and a third optical sheet 208, which are sequentially stacked one on another, to improve brightness and viewing angle of the light exiting from the light guide plate 220.

The first optical sheet 206 serves as a diffusion sheet and is configured to diffuse the light exiting from the light guide plate 210. The second optical sheet 207 serves as a prism sheet and is configured to condense the diffused light by the diffusion sheet in a vertical direction to the plane surface of the display panel 100. The third optical sheet 208 serves as a protective sheet and is configured to protect the second optical sheet 207 from external impacts. At least one of the first, second and third optical sheets 206, 207 and 208 may be provided in a plural number, and in an alternative exemplary embodiment, one of the first, second and third optical sheets 206, 207 and 208 may be omitted.

The reflective sheet 230 reflects the light leaked downward from the light guide plate 220 such that the leaked light is re-incident to the light guide plate 220. The reflective sheet 230 includes a material that is configured to reflect the light.

The mold frame 400 is interposed between the display panel 100 and the backlight unit 200 and is configured to support the display panel 100.

The bottom chassis 250 accommodates the backlight unit 200.

The top chassis 500 faces the bottom chassis 250 and is coupled to the bottom chassis 250 to cover an edge of the display panel 100 in the plan view.

The display device 10 further includes a band-pass filter BF, a recycling layer RL, a first transparent layer TL1 and a second transparent layer TL2.

The band-pass filter BF is disposed between the color conversion layer 301 and the display panel 100. The band-pass filter BF selectively transmits the first light L1. The band-pass filter BF includes a red band-pass filter BF_R overlapped with the red pixel area PXL_R and a green band-pass filter BF_G overlapped with the green pixel area PXL_G, but the invention is not limited thereto or thereby. The band-pass filter BF may be overlapped with the blue pixel area PXL_B and disposed on the entire surface of the display panel 100.

The recycling layer RL is disposed on the color conversion layer 301 to reflect at least a portion of the first light L1 passing through the color conversion layer 301. The recycling layer RL reflects at least the portion of the first light L1 to recycle the first light L1, and thus the light emission efficiency of the display device 10 may be improved.

The first transparent layer TL1 is disposed between the scattering layer 302 and the display device 100. The first transparent layer TL1 is disposed in the same layer as the band-pass filter BF. However, when the blue color conversion layer (not shown) is used instead of the scattering layer 302, the recycling layer RL may be used instead of the first transparent layer TL1.

The second transparent layer TL2 is disposed between the scattering layer 302 and the third base substrate SUB3. The second transparent layer TL2 is disposed in the same layer as the recycling layer RL. However, when the blue color conversion layer (not shown) is used instead of the scattering layer 302, the band-pass filter BF may be used instead of the second transparent layer TL2.

Figure 4:
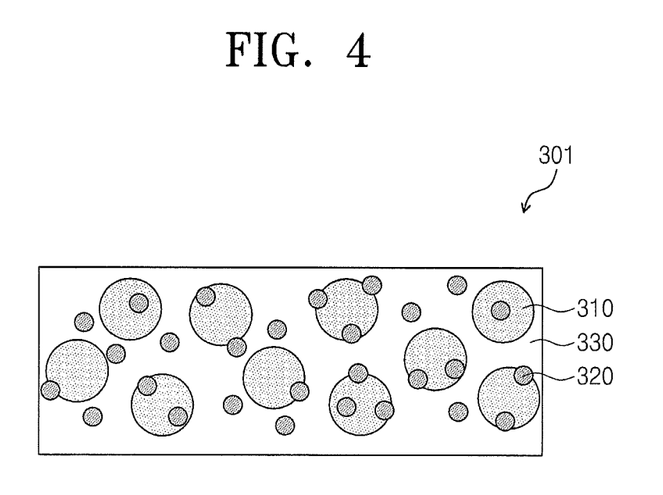
FIGS. 4 to 10 are cross-sectional views showing exemplary embodiments of a color conversion layer according to the invention.

Referring to FIG. 4, the color conversion layer 301 is disposed on the display panel 100 and includes the light emitting particles 310 and the metal particles 320. The color conversion layer 301 including the light emitting particles 310 and the metal particles 320 also includes the insulating material 330. The insulating material 330 may include the silicon resin or the epoxy resin. In addition, the insulating material 330 has the light transmittance, and thus the emission efficiency of the light passing through the insulating material 330 may be improved.

The light emitting particles 310 are included in the color conversion layer 301. The light emitting particles 310 may be a fluorescent substance or a quantum dot.

The light emitting particles 310 receive the first light L1 and generate a second light L2 having a wavelength different from that of the first light L1. In an exemplary embodiment, for instance, the light emitting particles 310 included in the red color conversion layer 301_R may be red fluorescent substances 310_R and the light emitting particles 310 included in the green color conversion layer 301_G may be green fluorescent substances 310_G.

The metal particles 320 are included in the color conversion layer 301. The metal particles 320 scatter the first light L1, and thus the light leakage and the color mixture are reduced.

The metal particles 320 receive at least one of the first light L1 and the second light L2 and cause the surface plasmon resonance. In the exemplary embodiment, the first light L1 is the blue light L_B, and the second light L2 is collectively the green light L_G and the red light L_R.

In more detail, a surface plasmon, in which electrons are collectively excited, occurs on the surface of the metal particles 320, and a surface plasmon wave is generated by the surface plasmon. The surface plasmon wave is an electromagnetic wave, but the surface plasmon wave travels along the surface of the metal particles 320, which is different from the electromagnetic wave that travels in random fashion.

When at least one light of the first and second lights L1 and L2 is incident to the metal particles 320, the one light is referred to as an incident light and an angle of the light incident to the metal particles 320, e.g., an angle between a normal line vertical to the surface of the metal particles 320 and the incident light, is referred to as an incident angle. A phase of the incident light coincides with a phase of the surface plasmon wave at a specific value of the incident angle. Where the phase of the incident light coincides with a phase of the surface plasmon wave at a specific value of the incident angle, energy of the incident light is absorbed by the metal particles 320, and thus an electric field distribution in a direction vertical to the interface is exponentially-functionally increased, but the electric field is extremely reduced as it goes inside of the metal particles 320. This phenomenon is called the surface plasmon resonance, and the incident angle while the surface plasmon resonance is generated is called a surface plasmon resonance angle.

When the electric field is locally applied on the surface of the metal particles 320 by the surface plasmon resonance, a resonant wave is produced by the metal particles 320. When the resonant wave is generated by the metal particles 320 and a peak wavelength of the resonant wave is in the wavelength range of the second light L2, light-resonant coupling occurs, in which the second light L2 is amplified by the resonant wave.

Due to the light-resonant coupling, the light emission efficiency of the light emitting particles 310 is improved and intensity of the second light L2 generated by the light emitting particles 310 is enhanced. Therefore, even though the intensity of the first light L1 is decreased, the intensity of the second light L2 may be secured by the light-resonant coupling, thereby improving the light emission efficiency of the display device 10.

In addition, the display device 10 may secure the second light L2 having sufficient intensity by the surface plasmon resonance of the metal particles 320. Thus, although the color conversion layer 301 is disposed on the display panel 100, the high light emission efficiency is secured.

The metal particles 320 may include at least one selected from gold, silver, aluminum, platinum, palladium, cadmium, cobalt, ruthenium, copper, indium, nickel, iron and alloys thereof.

The metal particles 320 may have a spherical shape, but the shape of the metal particles 320 should not be limited to the spherical shape. That is, the metal particles 320 may have various shapes, e.g., a bar shape, a tetrahedral shape, a hexahedral shape, an octahedral shape, etc.

FIGS. 4 to 10 are cross-sectional views showing exemplary embodiments of a color conversion layer 301 according to the invention.

Referring to FIG. 4, the light emitting particles 310 and the metal particles 320 may be distributed in the color conversion layer 301. That is, the light emitting particles 310 and the metal particles 320 may be randomly distributed in the color conversion layer 301. The metal particles 320 may be distributed to be separated from the light emitting particles 310 or disposed on the surface of the light emitting particles 310 (where a metal particle 320 is shown to overlap a light emitting particle 310).

Figure 5:
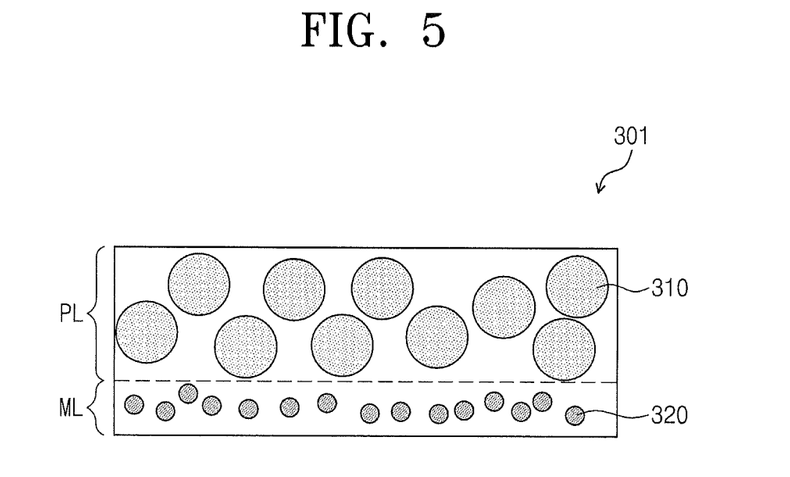

Referring to FIG. 5, the color conversion layer 301 may include a light emitting particle layer PL and a metal particle layer ML. The light emitting particle layer PL collectively includes the light emitting particles 310 and the metal particle layer ML collectively includes the metal particles 320. The light emitting particle layer PL may collectively include an entire of the light emitting particles 310 and the metal particle layer ML may collectively include an entire of the metal particles 320, of a color conversion layer 301. The light emitting particles 310 and the metal particles 320 are stratified into layers to define the particle layer PL and the metal particle layer ML. In FIG. 5, the light emitting particle layer PL is disposed on (e.g., above) the metal particle layer ML, but the invention is not limited thereto or thereby. That is, the metal particle layer ML may be disposed on the light emitting particle layer PL.

Figure 6:
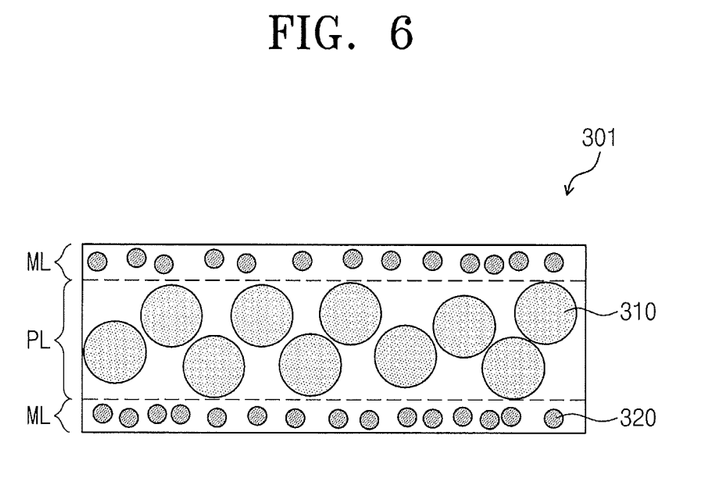

Referring to FIG. 6, the metal particle layer ML may be provided in a plural number. The metal particle layers ML are disposed to be spaced apart from each other as shown in FIG. 6. The light emitting particle layer PL is disposed between the metal particle layers ML, but the invention is not limited thereto or thereby. That is, the light emitting particle layer PL may be disposed on the metal particle layers ML, or the metal particle layers ML may be disposed on the light emitting particle layer PL. The light emitting particle layer PL may collectively include an entire of the light emitting particles 310, and each metal particle layer ML may include a portion of an entire of the metal particles 320, of a color conversion layer 301.

The metal particles 320 may collectively include first metal particles 321 and second metal particles 322. The second metal particles 322 include a metal material different from that of the first metal particles 321.

Figure 7:
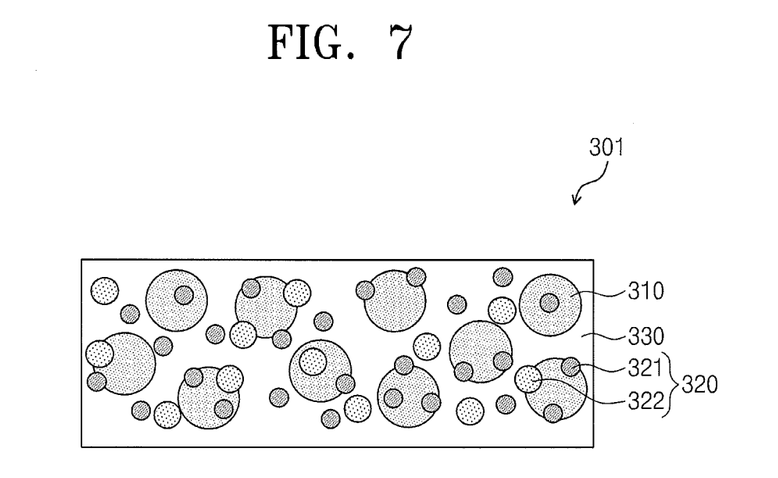

Referring to FIG. 7, the light emitting particles 310, the first metal particles 321 and the second metal particles 322 may be distributed in the color conversion layer 301. That is, the light emitting particles 310, the first metal particles 321 and the second metal particles 322 may be randomly distributed in the color conversion layer 301. The first and second metal particles 321 and 322 may be disposed to be separated from the light emitting particles 310 or disposed on the surface of the light emitting particles 310 (where a metal particle 320 is shown to overlap a light emitting particle 310).

Figure 8:
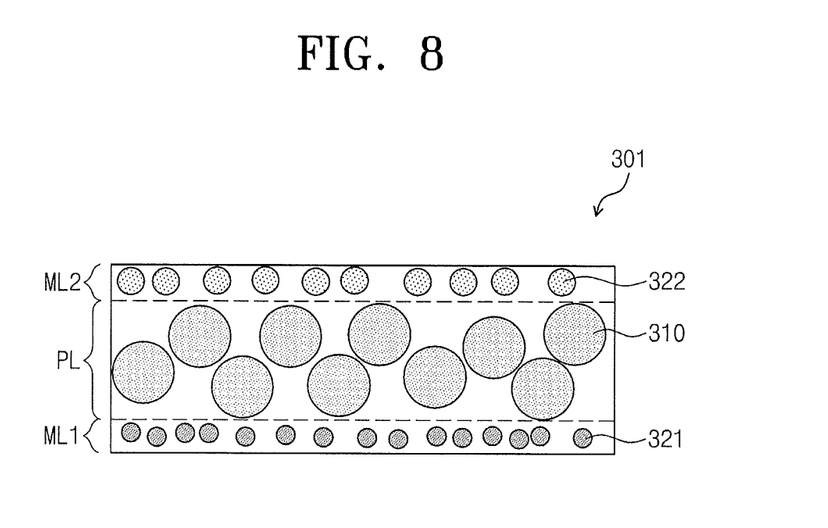

Referring to FIG. 8, the color conversion layer 301 includes a light emitting particle layer PL, a first metal particle layer ML1 and a second metal particle layer ML2. The light emitting particle layer PL includes the light emitting particles 310, the first metal particle layer ML1 includes the first metal particles 321, and the second metal particle layer ML2 includes the second metal particles 322. The light emitting particle layer PL may collectively include an entire of the light emitting particles 310, the first metal particle layer ML1 may collectively include an entire of the first metal particles 321 and the second metal particle layer ML2 may collectively include an entire of the second metal particles 322, of a color conversion layer 301.

In FIG. 8, the light emitting particle layer PL is disposed on the first metal particle layer ML1, and the second metal particle layer ML2 is disposed on the light emitting particle layer PL, but the invention is not limited thereto or thereby. In an exemplary embodiment, for instance, the second metal particle layer ML2 may be disposed on (e.g., above) the first metal particle layer ML1, and the light emitting particle layer PL may be disposed on the second metal particle layer ML2. As another exemplary embodiment, the light emitting particle layer PL may be disposed on the second metal particle layer ML2, and the first metal particle layer ML1 may be disposed on the light emitting particle layer PL. In addition, the first and second metal particle layers ML1 and ML2 may be disposed on the light emitting particle layer PL.

Figure 9:
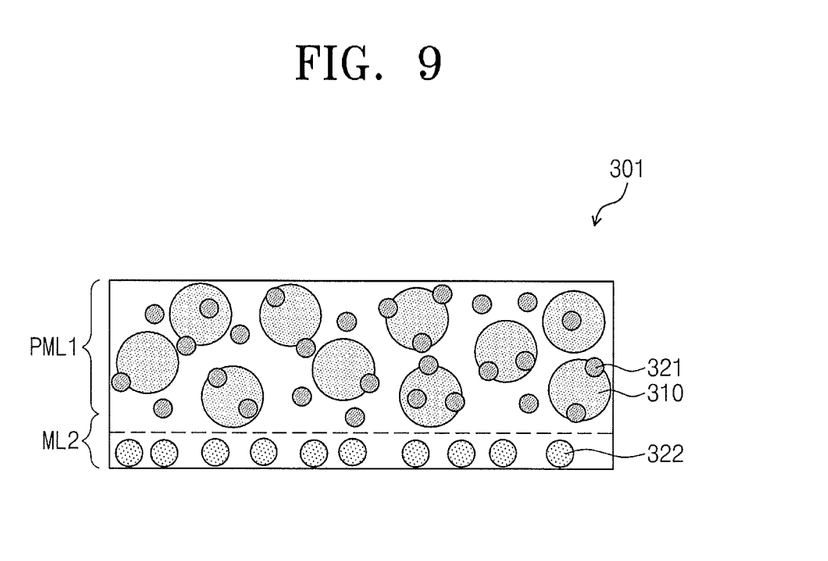

Referring to FIG. 9, the color conversion layer 301 includes a first light emitting metal layer PML1 and a second metal particle layer ML2. The first light emitting metal layer PML1 includes the light emitting particles 310 and the first metal particles 321. That is, the light emitting particles 310 and the first metal particles 321 may be randomly distributed in the first light emitting metal layer PML1. The first metal particles 321 may be separated from the light emitting particles 310 or disposed on the surface of the light emitting particles 310 (where a first metal particle 321 is shown to overlap a light emitting particle 310). The first light emitting metal layer PML1 is considered a single stratified layer of the color conversion layer 301. The first light emitting particle layer PL1 may collectively include an entire of the light emitting particles 310 and an entire of the first metal particles 321, and the second metal particle layer ML2 may collectively include an entire of the second metal particles 322, of a color conversion layer 301.

In FIG. 9, the first light emitting metal layer PML1 is disposed on (e.g., above) the second metal particle layer ML2, but the invention is not limited thereto or thereby. That is, the second metal particle layer ML2 may be disposed on the first light emitting metal layer PML1. The second metal particle layer ML2 is considered a single stratified layer of the color conversion layer 301.

Figure 10:
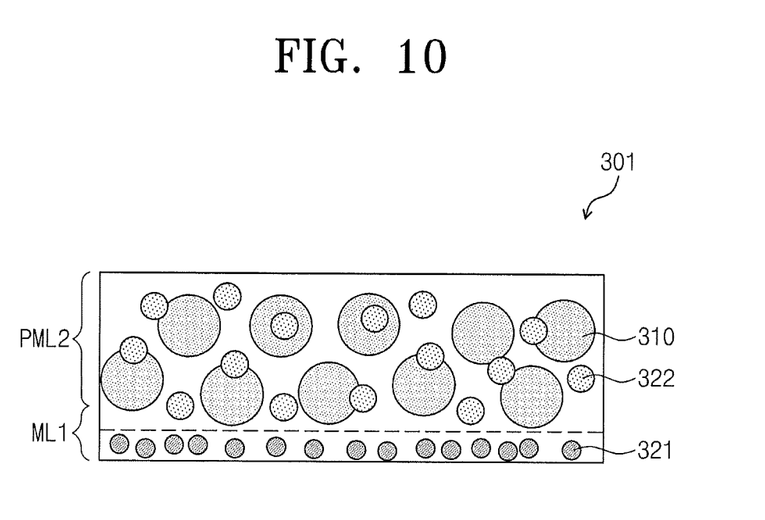

Referring to FIG. 10, the color conversion layer 301 includes a second light emitting metal layer PML2 and a first metal particle layer ML1. The second light emitting metal layer PML2 includes the light emitting particles 310 and the second metal particles 322. That is, the light emitting particles 310 and the second metal particles 322 may be randomly distributed in the second light emitting metal layer PML2. The second metal particles 322 may be separated from the light emitting particles 310 or disposed on the surface of the light emitting particles 310 (where a second metal particle 322 is shown to overlap a light emitting particle 310. The second light emitting metal layer PML2 is considered a single stratified layer of the color conversion layer 301. The second light emitting particle layer PL2 may collectively include an entire of the light emitting particles 310 and an entire of the second metal particles 322, and the first metal particle layer ML1 may collectively include an entire of the first metal particles 321, of a color conversion layer 301.

In FIG. 10, the second light emitting metal layer PML2 is disposed on (e.g., above) the first metal particle layer ML1, but the invention is not limited thereto or thereby. That is, the first metal particle layer ML1 may be disposed on the second light emitting metal layer PML2. The first metal particle layer ML1 is considered a single stratified layer of the color conversion layer 301.

Figure 11:
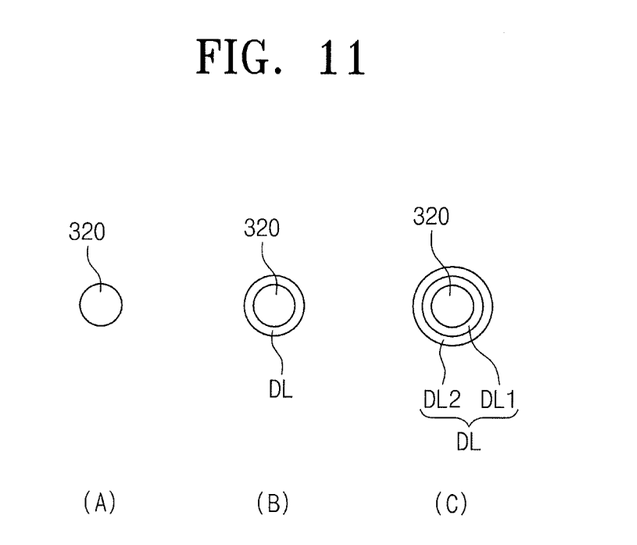
FIG. 11 is a view showing exemplary embodiments of a metal particle with respect to a dielectric layer according to the invention.

FIG. 11 is a view showing exemplary embodiments of metal particles with respect to a dielectric layer according to the invention.

A portion of the metal particles 320 within the color conversion layer 301 may be coated with a dielectric layer DL. In an exemplary embodiment, for instance, a portion of the metal particles 320 is coated with the dielectric layer DL and another portion of the metal particles 320, such as a remaining portion of the metal particles 320 within the color conversion layer 301, is not coated with the dielectric layer DL.

The dielectric layer DL may change the range of the peak wavelength of the resonant wave of the metal particles 320. In detail, as a thickness of the dielectric layer DL increases in a range from about 1 nanometer (nm) to about 500 nm, the wavelength of the resonant wave is increased by about tens of nm or more. The thickness of the dielectric layer DL is taken in a direction normal to the surface of the metal particle 320.

Referring to (A) of FIG. 11, the dielectric layer DL is not disposed on the metal particle 320.

Referring to (B) or FIG. 11, the dielectric layer DL is disposed in a single-layer structure on the metal particle 320.

Referring to (C) of FIG. 11, the dielectric layer DL may include a plurality of sub-layers such as a first dielectric layer DL1 and a second dielectric layer DL2, and the first dielectric layer DL1 is coated with the second dielectric layer DL2 such that the second dielectric layer DL2 forms the outermost layer of the collective multi-layered particle.

The dielectric layer DL includes an insulating material having a light transmittance, e.g., a nitride material, an oxide material, etc. The oxide material includes at least one of titanium oxide, silicon oxide, magnesium oxide, aluminum oxide and yttrium oxide, and the nitride material includes at least one of silicon nitride and aluminum nitride.

One or more exemplary embodiment of the display device according to the invention includes the color conversion layer, in which the metal particles are distributed to scatter the first light, thereby reducing or effectively preventing occurrence of the light leakage and the color mixture between adjacent pixels areas. In addition, one or more exemplary embodiment of the display device according to the invention generates the second light with the relatively high intensity using the surface plasmon resonance of the metal particles, and thus the light emission efficiency of the display device is improved even though the color conversion layer is disposed on the display panel.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
   a display panel to emit a first light;
   a backlight unit configured to provide the first light to the display panel; and
   a color conversion layer which receives the first light from the display panel, the color conversion layer comprising:
      a red color conversion layer; and
      a green color conversion layer,
   wherein each of the red color conversion layer and the green color conversion layer comprises:
      light emitting particles configured to receive the first light and generate a second light having a wavelength different from the first light; and
      metal particles configured to receive the first light or the second light and cause a surface plasmon resonance,
   wherein
      the metal particles of the red color conversion layer comprise first metal particles which comprise a first metal material and second metal particles which comprise a second metal material different from the first metal material, and
      the metal particles of the green color conversion layer comprise third metal particles which comprise a third metal material and fourth metal particles which comprise a fourth metal material different from the third metal material.

2. The display device of claim 1, wherein the light emitting particles and the metal particles are distributed in the color conversion layer.

3. The display device of claim 1, wherein the color conversion layer comprises:
   a light emitting particle layer comprising an entirety of the light emitting particles of the color conversion layer; and
   a metal particle layer on the light emitting particle layer and comprising an entirety of the metal particles of the color conversion layer
   wherein in a thickness direction of the color conversion layer, the metal particles of the metal particle layer are disposed non-overlapping with the light emitting particles of the light emitting particle layer.

4. The display device of claim 3, wherein the metal particle layer for which the metal particles are disposed non-overlapping with the light emitting particles of the light emitting particle layer in the thickness direction of the color conversion layer, comprises a first metal particle layer and a second metal particle layer respectively disposed at opposing sides of the light emitting particle layer.

5. The display device of claim 1, wherein the each color conversion layer comprises:
   a light emitting particle layer comprising an entirety of the light emitting particles of the each color conversion layer;
   a first metal particle layer on the light emitting particle layer and comprising an entirety of the first metal particles of the each color conversion layer; and
   a second metal particle layer on the light emitting particle layer and comprising an entirety of the second metal particles of the each color conversion layer,
   wherein in a thickness direction of the color conversion layer, the first and second metal particles of the first and second metal particle layers are each disposed non-overlapping with the light emitting particles of the light emitting particle layer.

6. The display device of claim 1, wherein the each color conversion layer comprises:
   a first light emitting metal layer in which an entirety of the light emitting particles and an entirety of the first metal particles of the each color conversion layer are distributed; and
   a second metal particle layer on the first light emitting metal layer and comprising an entirety of the second metal particles of the each color conversion layer,
   wherein in a thickness direction of the color conversion layer, the second metal particles of the second metal particle layer are disposed non-overlapping with the light emitting particles and the first metal particles of the light emitting particle layer.

7. The display device of claim 1, wherein the each color conversion layer comprises:
   a second light emitting metal layer in which an entirety of the light emitting particles and an entirety of the second metal particles of the each color conversion layer are distributed; and a first metal particle layer on the second light emitting metal layer and comprising an entirety of the first metal particles of the each color conversion layer, wherein in a thickness direction of the color conversion layer, the first metal particles of the first metal particle layer are disposed non-overlapping with the light emitting particles and the second metal particles of the light emitting particle layer.

8. The display device of claim 1, wherein the first light is a blue light.

9. The display device of claim 1, wherein the display panel comprises a plurality of pixel areas, each of the pixel areas comprising:
a red pixel area;
a green pixel area; and
a blue pixel area,
the red color conversion layer is overlapped with the red pixel area; and
the green color conversion layer is overlapped with the green pixel area.

10. The display device of claim 9, further comprising a scattering layer overlapped with the blue pixel area, wherein the scattering layer comprises scatter particles configured to scatter the first light.

11. The display device of claim 10, wherein an average particle diameter of the first metal particles and the second metal particles is greater than an average particle diameter of the third metal particles and the fourth metal particles.

12. The display device of claim 11, wherein an average particle diameter of the scatter particles is smaller than the average particle diameter of the third metal particles and the fourth metal particles.

13. The display device of claim 1, further comprising:
a band-pass filter between the color conversion layer and the display panel; and
a recycling layer on the color conversion layer and configured to reflect a portion of the first light passed through the color conversion layer.

14. The display device of claim 1, wherein the metal particles comprise at least one selected from gold, silver, aluminum, platinum, palladium, cadmium, cobalt, ruthenium, copper, indium, nickel, iron and alloys thereof.

15. The display device of claim 1, wherein a portion of the metal particles within the color conversion layer comprises a dielectric layer respectively thereon.

16. The display device of claim 15, wherein the dielectric layer comprises:
a first dielectric sub-layer; and
a second dielectric sub-layer on the first dielectric sub-layer.

17. The display device of claim 15, wherein the dielectric layer comprises at least one selected from titanium oxide, silicon oxide, magnesium oxide, aluminum oxide, yttrium oxide, silicon nitride and aluminum nitride.

18. The display device of claim 1, wherein the light emitting particles comprise fluorescent material or a quantum dot.

19. The display device of claim 1, wherein the third metal material is identical to the first metal material, and the fourth metal material is identical to the second metal material.

* * * * *